US011971866B2

(12) United States Patent
Mishra et al.

(10) Patent No.: US 11,971,866 B2
(45) Date of Patent: Apr. 30, 2024

(54) DETERMINING DIFFERENCES BETWEEN WEB ELEMENTS OF DIFFERENT VERSIONS OF A WEB APPLICATION

(71) Applicant: Dell Products L.P., Round Rock, TX (US)

(72) Inventors: Abhishek Mishra, Bangalore (IN); Anusha N, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 17/956,967

(22) Filed: Sep. 30, 2022

(65) Prior Publication Data
US 2024/0111740 A1    Apr. 4, 2024

(51) Int. Cl.
*G06F 16/00*    (2019.01)
*G06F 16/21*    (2019.01)
*G06F 16/22*    (2019.01)
*G06F 16/81*    (2019.01)

(52) U.S. Cl.
CPC ........ *G06F 16/219* (2019.01); *G06F 16/2246* (2019.01); *G06F 16/81* (2019.01)

(58) Field of Classification Search
None
See application file for complete search history.

(56) References Cited

U.S. PATENT DOCUMENTS

| 8,788,885 | B1* | 7/2014 | Cook | G06F 11/2294 |
| | | | | 714/25 |
| 2006/0218160 | A1* | 9/2006 | Bhatia | G06F 40/137 |
| 2012/0109905 | A1* | 5/2012 | Tingstrom | G06F 40/154 |
| | | | | 707/E17.127 |
| 2017/0357624 | A1* | 12/2017 | Punjabi | G06F 40/103 |
| 2018/0191764 | A1* | 7/2018 | Chawla | G06F 16/951 |
| 2019/0294528 | A1* | 9/2019 | Avisror | G06F 11/3688 |

OTHER PUBLICATIONS

A. Alshamrani et al., "A Comparison Between Three SDLC Models Waterfall Model, Spiral Model, and Incremental/Iterative Model," IJCSI International Journal of Computer Science Issues, vol. 12, No. 1, Jan. 2015, pp. 106-111.

(Continued)

*Primary Examiner* — Anhtai V Tran
(74) *Attorney, Agent, or Firm* — Ryan, Mason & Lewis, LLP

(57) ABSTRACT

An apparatus comprises a processing device configured to select first and second versions of at least a given portion of a web application, to obtain first and second document object model structures of the first and second versions of the given portion of the web application, and to generate, based at least in part on the first and second document object model structures, first and second tree structures, the first and second tree structures comprising nodes representing web elements of the given portion of the web application. The processing device is also configured to identify node differences between the first and second tree structures, to generate information characterizing differences between web elements in the given portion of the first and second versions of the web application, and to initiate automated action based at least in part on the generated information.

20 Claims, 13 Drawing Sheets

(56) References Cited

OTHER PUBLICATIONS

Selenium, "Selenium WebDriver," https://www.selenium.dev/other/, Accessed Sep. 28, 2022, 3 pages.
E. Hernandez, "What Are The Best UI Test Automation Tools?" https://techcommunity.microsoft.com/t5/testingspot-blog/what-are-the-best-ui-test-automation-tools/ba-p/367781, Mar. 13, 2019, 10 pages.
Cypress.IO, "Why Cyrpess?" https://docs.cypress.io/guides/overview/why-cypress#What-you-ll-learn, Accessed Sep. 28, 2022, 8 pages.

* cited by examiner

600

```
<div class="dds_col-3 dds_col—sm-3 ">
    <div class-"dds_card" style="background-color: #A8396F; color: white">
        <div class="dds_card_content">
            <div class="dds_card_header" style="margin-left : 5px">

<span class="dds_card_header_text">
                    <h5>Total RPA Volume</h5>
                </span>
            </div>
            <div class="dds_card_body" style="margin-left : 100px">
                <p>{{rpa_vol}}</p>
            </div>
        </div>
    </div>
</div>
```

WEB APPLICATION UI COMPARATOR TOOL

LINK TO PREVIOUS RELEASE WEB PAGE [BROWSE]

LINK TO CURRENT RELEASE WEB PAGE [BROWSE]

[COMPARE]

REPORT

PREVIOUS RELEASE VS. CURRENT RELEASE

```
VISUALIZATION OF UI DIFFERENCES
```

CURRENT RELEASE VS. PREVIOUS RELEASE

```
VISUALIZATION OF UI DIFFERENCES
```

LINKS

[TABULAR VIEW]

[VIEW CODE FILES]

[GENERATE XPATHS]

FIG. 8B

| HTML TAG ADDITIONS | HTML TAG DELETIONS |
|---|---|
| 1) LABEL TAG | 1) INPUT TAG |
| a. INNER TEXT: No. OF DAEs | a. INNER TEXT: No. OF DAEs |
| 2) STEPPED DROP DOWN INPUT TAG | 2) INPUT TAG |
| a. ID: NUM-DAE | a. INNER TEXT: DRIVE CAPACITY (TB) |
| 3) LABEL TAG | 3) INPUT TAG – TYPE CHECK BOX |
| a. INNER TEXT: DRIVE CAPACITY (TB) | a. ID: DISPLAY |
| 4) STEPPED DROP DOWN INPUT TAG | 4) INPUT TAG TYPE = BUTTON |
| a. ID: DRIVE-CAPACITY | INNER TEXT: NEXT |
| 5) LABEL TAG | |
| a. INNER TEST DISPLAY | |
| 6) TOGGLE | |
| a. ID: SWITCH-ROLE-DISPLAY | |
| 7) ANCHOR TAG | |
| a. INNER TEXT: NEXT | |

DETERMINING DIFFERENCES BETWEEN WEB ELEMENTS OF DIFFERENT VERSIONS OF A WEB APPLICATION

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for determining differences between web elements of different versions of web applications.

In one embodiment, an apparatus comprises at least one processing device comprising a processor coupled to a memory. The at least one processing device is configured to perform the steps of selecting first and second versions of at least a given portion of a web application, obtaining first and second document object model structures of the first and second versions of the given portion of the web application, and generating, based at least in part on the first and second document object model structures, first and second tree structures, the first and second tree structures comprising nodes representing web elements of the given portion of the web application. The at least one processing device is also configured to perform the steps of identifying node differences between the first and second tree structures, and generating, based at least in part on the identified node differences, information characterizing differences between web elements in the given portion of the first and second versions of the web application. The at least one processing device is further configured to perform the step of initiating at least one automated action based at least in part on the generated information characterizing differences between web elements in the given portion of the first and second versions of the web application.

These and other illustrative embodiments include, without limitation, methods, apparatus, networks, systems and processor-readable storage media.

BRIEF DESCRIPTION OF THE DRAWINGS

FIG. 6 shows a document object model structure of a web application in an illustrative embodiment.

FIGS. 8A-8C show user interface views of a graphic user interface web application comparator tool in an illustrative embodiment

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
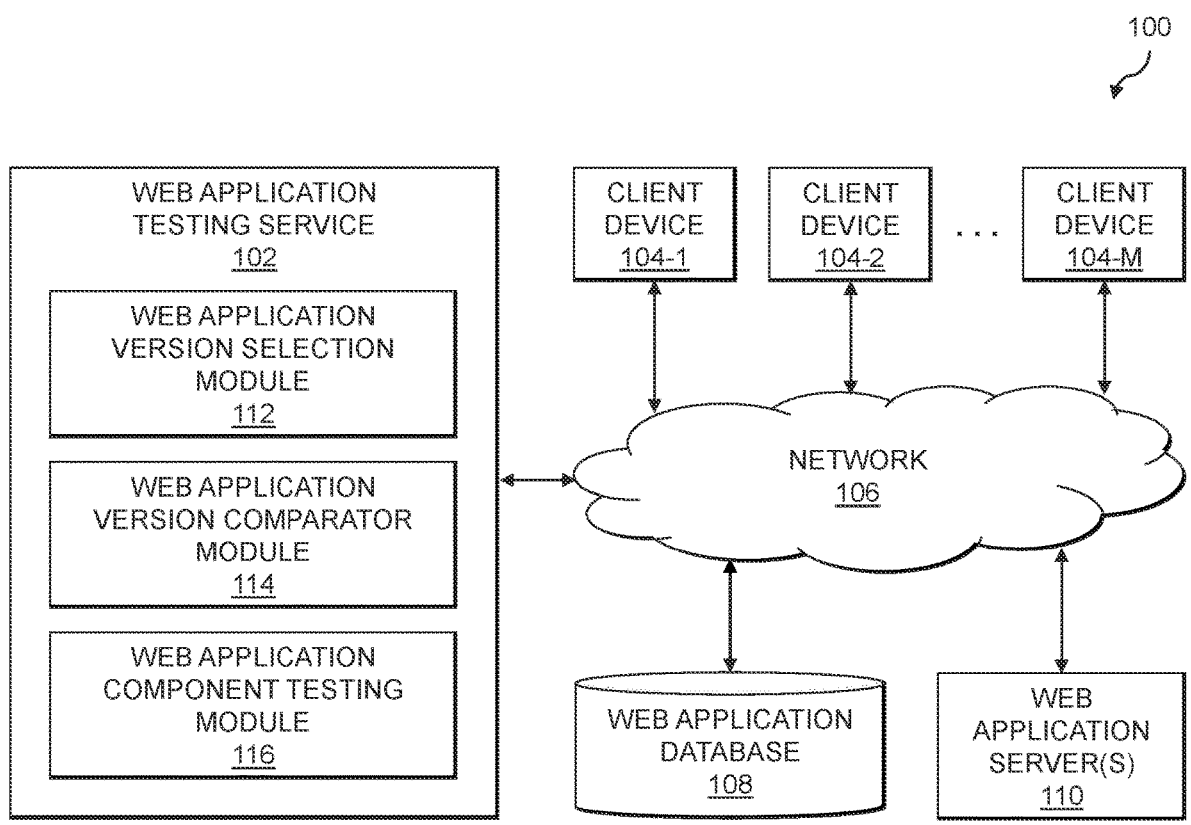
FIG. 1 is a block diagram of an information processing system configured for determining differences between web elements of different versions of web applications in an illustrative embodiment.

FIG. 1 shows an information processing system 100 configured in accordance with an illustrative embodiment. The information processing system 100 is assumed to be built on at least one processing platform and provides functionality for determining differences between web elements of different versions of web applications. The information processing system 100 includes a web application testing service 102, which is coupled via a network 106 to a set of web application servers 110. The web application servers 110 are assumed to be accessed, over network 106, by client devices 104-1, 104-2, . . . 104-M (collectively, client devices 104), such as via web browsers running on the client devices. Also coupled to the network 106 is a web application database 108, which may store various information relating to the web applications hosted by the web application servers 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications hosted by the web application servers 110. Such information may include, but is not limited to, component hierarchies for the web applications, string identifiers for components of the web applications, etc.

The web application database 108 in some embodiments is implemented using one or more storage systems or devices associated with the web application testing service 102 or web application servers 110. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web application testing service 102, the client devices 104, the web application database 108, and the web application servers 110, as well as to support communication between the web application testing service 102, client devices 104, web application database 108, web application servers 110 and other related systems and devices not explicitly shown.

In some embodiments, the client devices 104 and/or web application servers 110 may implement host agents that are configured for communication with the web application testing service 102. The host agents may be configured to invoke the web application testing service 102 when a particular web application (e.g., that is hosted by one of the web application servers 110 and which is run partially in a web browser on one of the client devices 104) is updated so as to determine which elements of the web application have been added, removed or altered, for generating test cases for testing such added, removed or altered elements, for generating reports characterizing the element differences between the different versions of the web application, for generating locators to the added, removed or altered elements, etc.

It should be noted that a "host agent" as this term is generally used herein may comprise an automated entity, such as a software entity running on a processing device. Accordingly, a host agent need not be a human entity.

Although shown as separate from the client devices 104 and web application servers 110 in the FIG. 1 embodiment, it should be appreciated that the web application testing service 102 may be implemented at least in part within one or more of the client devices 104 or web application servers 110 in some embodiments.

The web application testing service 102 in the FIG. 1 embodiment is assumed to be implemented using at least one processing device. Each such processing device generally comprises at least one processor and an associated memory, and implements one or more functional modules for controlling certain features of the web application testing service 102. In the FIG. 1 embodiment, the web application testing service 102 implements a web application version selection module 112, a web application version comparator module 114, and a web application component testing module 116.

The web application version selection module 112 is configured to select first and second versions of at least a given portion of a web application, and to obtain first and second document object model structures of the first and second versions of the given portion of the web application. The web application version comparator module 114 is configured to generate, based at least in part on the first and second document object model structures, first and second tree structures. The first and second tree structures comprise nodes representing web elements of the given portion of the web application. The web application version comparator module 114 is further configured to identify node differences between the first and second tree structures, and to generate, based at least in part on the identified node differences, information characterizing differences between web elements in the given portion of the first and second versions of the web application. The web application component testing module 116 is configured to initiate at least one automated action based at least in part on the generated information characterizing differences between web elements in the given portion of the first and second versions of the web application. Such an automated action may include, but is not limited to, selecting and running automation test cases for testing web elements of the first version of the web application which are changed from the second version of the web application.

It is to be appreciated that the particular arrangement of the web application version selection module 112, the web application version comparator module 114, and the web application component testing module 116 illustrated in the FIG. 1 embodiment is presented by way of example only, and alternative arrangements can be used in other embodiments. As discussed above, for example, the web application testing service 102, or portions thereof such as one or more of the web application version selection module 112, the web application version comparator module 114, and the web application component testing module 116, may in some embodiments be implemented internal to one or more of the client devices 104 or web application servers 110. As another example, the functionality associated with the web application version selection module 112, the web application version comparator module 114, and the web application component testing module 116 may be combined into one module, or separated across more than three modules with the multiple modules possibly being implemented with multiple distinct processors or processing devices.

At least portions of the web application version selection module 112, the web application version comparator module 114, and the web application component testing module 116 may be implemented at least in part in the form of software that is stored in memory and executed by a processor.

It is to be understood that the particular set of elements shown in FIG. 1 for determining differences between web elements of different versions of web applications is presented by way of illustrative example only, and in other embodiments additional or alternative elements may be used. Thus, another embodiment may include additional or alternative systems, devices and other network entities, as well as different arrangements of modules and other components.

The web application testing service 102 and other portions of the system 100 may be part of cloud infrastructure as will be described in further detail below. The cloud infrastructure hosting the web application testing service 102 may also host one or more of the web application servers 110 and/or client devices 104.

The web application testing service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web application testing service 102, client devices 104, web application database 108 and web application servers 110 or components thereof may be implemented on respective distinct processing platforms, although numerous other arrangements are possible. For example, in some embodiments at least portions of the web application testing service 102 and one or more of the client devices 104 or web application servers 110 are implemented on the same processing platform. A given one of the web application servers 110 or client devices 104 can therefore be implemented at least in part within at least one processing platform that implements at least a portion of the web application testing service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web application testing service 102, client devices 104, web application database 108 and web application servers 110, or portions or components thereof, to reside in different data centers. Numerous other distributed implementations are possible. The web application testing service 102 or portions thereof can also be implemented in a distributed manner across multiple data centers.

Additional examples of processing platforms utilized to implement the web application testing service 102 and other portions of the system 100 in illustrative embodiments will be described in more detail below in conjunction with FIGS. 10 and 11.

It is to be appreciated that these and other features of illustrative embodiments are presented by way of example only, and should not be construed as limiting in any way.

An exemplary process for determining differences between web elements of different versions of web applications will now be described in more detail with reference to the flow diagram of FIG. 2. It is to be understood that this particular process is only an example, and that additional or alternative processes for determining differences between web elements of different versions of web applications may be used in other embodiments.

In this embodiment, the process includes steps 200 through 210. These steps are assumed to be performed by the web application testing service 102 utilizing the web application version selection module 112, the web application version comparator module 114, and the web application component testing module 116. The process begins with step 200, selecting first and second versions of at least a given portion of a web application. The first version of the given portion of the web application may be associated with a current release of the web application and the second version of the given portion of the web application may be associated with a previous release of the web application. The given portion of the web application may comprise a web page of the web application. Step 200 may include selecting a first uniform resource locator for a given web page of the first version of the web application and selecting a second uniform resource locator for the given web page of the second version of the web application.

In step 202, first and second document object model structures of the first and second versions of the given portion of the web application are obtained. Step 202 may include invoking an application programming interface which takes as input uniform resource locators of the given portion of the first and second versions of the web application and which outputs the first and second document object model structures for the given portion of the first and second versions of the web application. First and second tree structures are generated in step 204 based at least in part on the first and second document object model structures. The first and second tree structures comprising nodes represent web elements of the given portion of the web application.

Node differences between the first and second tree structures are identified in step 206. Step 206 may include identifying one or more nodes present in the first tree structure which are not present in the second tree structure as added web elements in the first version of the given portion of the web application, identifying one or more nodes present in the second tree structure which are not present in the first tree structure as deleted web elements in the first version of the given portion of the web application, and identifying one or more nodes having element properties in the first tree structure that are different than element properties in corresponding nodes in the second tree structure as modified web elements in the first version of the given portion of the web application.

Figure 2:
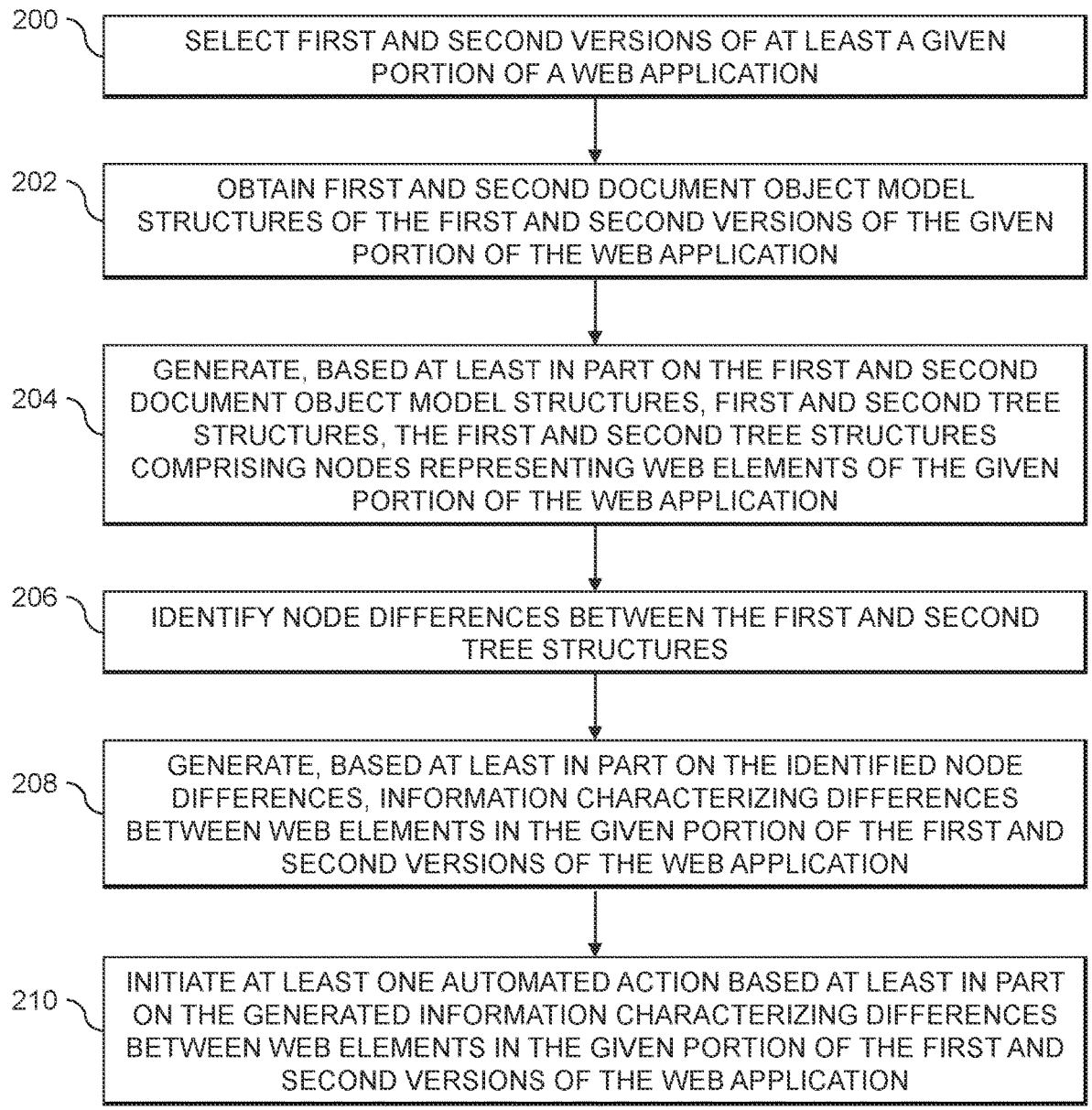
FIG. 2 is a flow diagram of an exemplary process for determining differences between web elements of different versions of web applications in an illustrative embodiment.

The FIG. 2 process continues with step 208, generating, based at least in part on the identified node differences, information characterizing differences between web elements in the given portion of the first and second versions of the web application. At least one automated action is initiated in step 210 based at least in part on the generated information characterizing differences between web elements in the given portion of the first and second versions of the web application. The automated action may include generating locators for the web elements which are added, deleted and modified in the given portion of the first version of the web application relative to the given portion of the second version of the web application. The generated locators may comprise Extensible Markup Language (XML) Path Language (XPath) locators. The generated locators may be utilized for updating one or more automation test cases for testing of the first version of the web application.

The automated action may also or alternatively include generating visualizations of the web elements which are added, deleted and modified in the given portion of the first version of the web application relative to the given portion of the second version of the web application. The automated action may further or alternatively include generating links to code files of the web elements which are added, deleted and modified in the given portion of the first version of the web application relative to the given portion of the second version of the web application. The automated action may also or alternatively include generating a tabular view categorizing which of the web elements are added, deleted and modified in the given portion of the first version of the web application relative to the given portion of the second version of the web application.

In some embodiments, the automated action includes running one or more automation test cases for testing web elements in the given portion of the first version of the web application which are changed relative to the second version of the web application. The one or more automation test cases may be selected from an automation testing suite, the one or more automation test cases being customized for testing of the web elements in the given portion of the first version of the web application which are changed relative to the second version of the web application.

Figure 3:
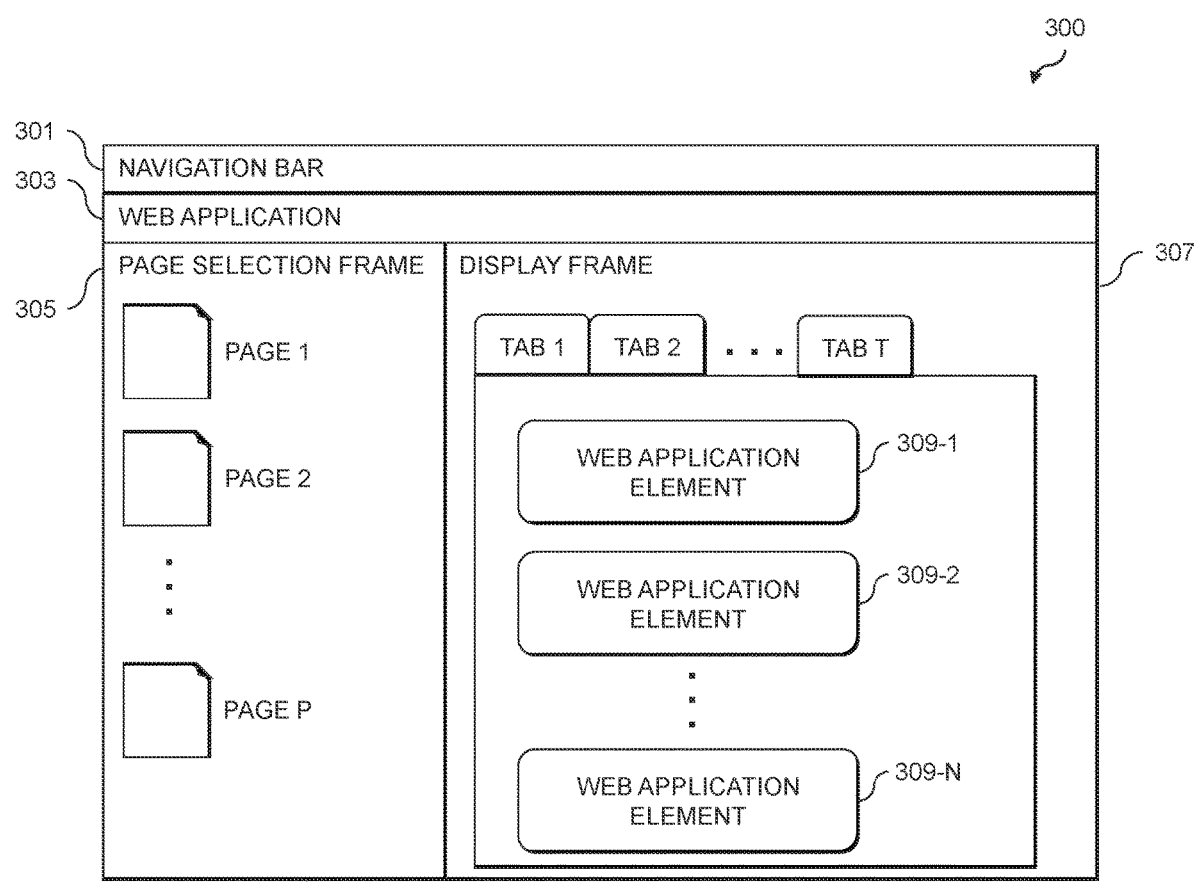
FIG. 3 illustrates a view of different portions of a web application in an illustrative embodiment.

FIG. 3 shows an example layout 300 of a web application 303. The layout 300 includes a navigation bar 301, which may be a portion of a web browser that is utilized to type in or otherwise input uniform resource locators (URLs) to load the web application 303. The web application 303 also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of web application elements 309-1, 309-2, . . . 309-N (collectively, web application elements 309). The web application elements 309 may comprise charts, plots, tables, visualizations, widgets, or other elements of the web application 303.

Various web application frameworks may utilize a component-based architecture. Some web application frameworks further have a modular architecture, where modules are utilized to organize the web application into functional blocks wrapping components thereof (as well as other parts or portions of the web application, such as directives and services). In the modular architecture, the web application includes a root module and possibly one or more additional modules. Each of the additional modules may be utilized for a particular type of functionality or feature of the web application.

The components of a web application may be viewed as basic building blocks for a user interface (UI) of the web application. Each component may control one or more portions of the display, also referred to as views, provided by the web application. Components are self-contained, and provide reusable pieces of the UI of the web application. More generally, each component encapsulates some functionality of the web application. A given component may include a template defining a visual structure (e.g., using one or more HyperText Markup Language (HTML) files), logic defining its behavior (e.g., using JavaScript code, TypeScript code, etc.), and a style that defines the style of the component (e.g., using one or more Cascading Style Sheet (CSS) files). Components pass data to associated views using data binding processes (e.g., by binding Document Object Model (DOM) elements to component properties). Components of the web application may utilize services (e.g., values, functions, features), where the services provide classes with a specific purpose (e.g., fetching data, logging, etc.). Services may be used to share resources across components of the web application.

Figure 4:
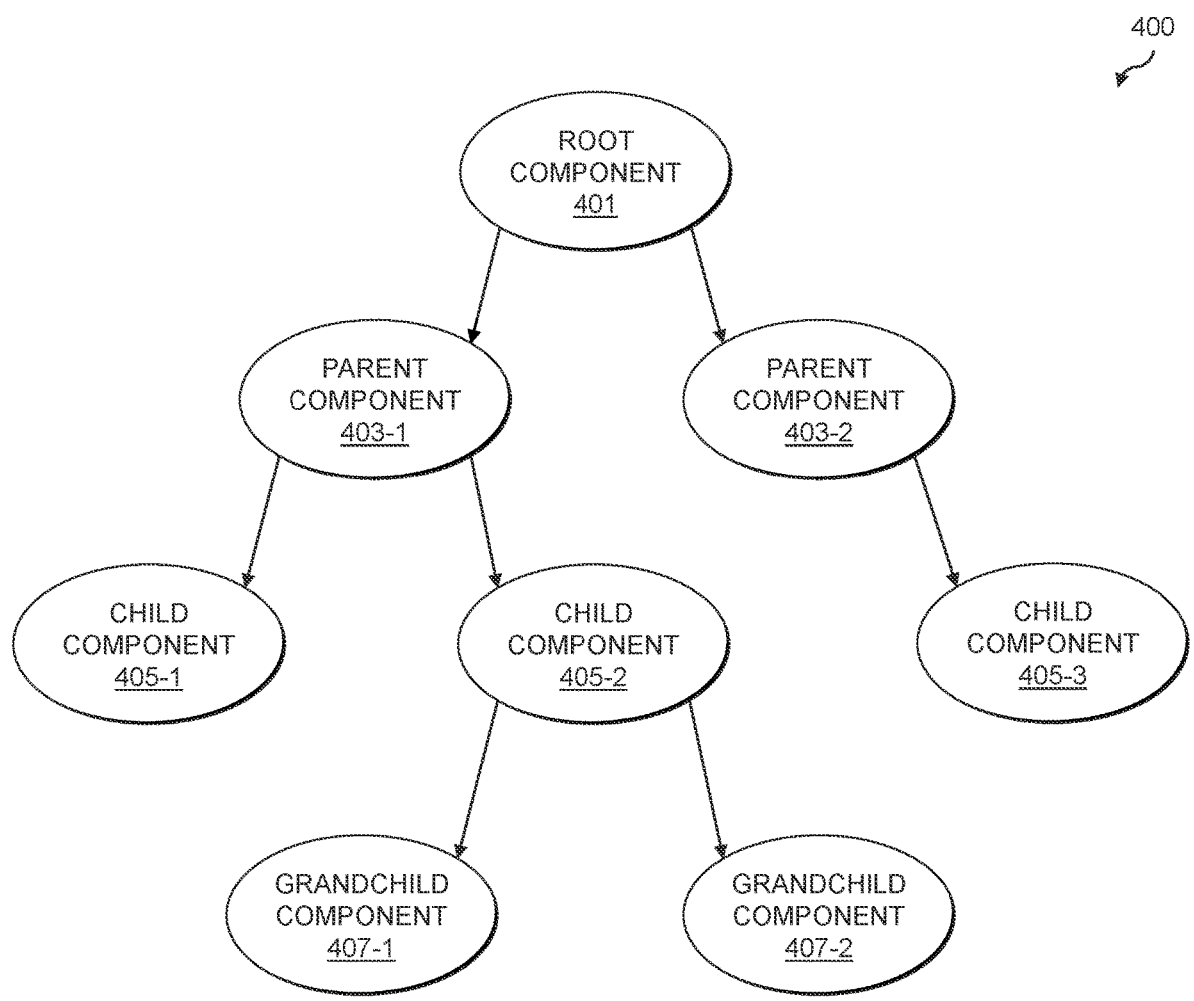
FIG. 4 shows a component hierarchy for a web application in an illustrative embodiment.

A web application may be viewed as a tree-like hierarchy of its components. FIG. 4 shows an example of a tree-like hierarchy 400 of components of a web application. In the hierarchy 400, there is a root component 401, and two parent components 403-1 and 403-2. The parent component 403-1 has two child components 405-1 and 405-2, and the parent component 403-2 has a child component 405-3. The child component 405-2 has two grandchild components 407-1 and 407-2. The root component 401 may also be referred to as an application component. To consider a specific example, the parent component 403-1 may provide a menu UI element, while the parent component 403-2 provides a shopping cart UI element. The child components 405-1 and 405-2 may provide different menu item UI elements in the menu UI element of parent component 403-1. The grandchild components 407-1 and 407-2 may provide sub-items in the menu UI element of child component 405-1. The child component 405-3 may provide a button UI element (e.g., a "checkout" button) for the shopping cart UI element of parent component 403-2. It should be appreciated that the above example hierarchy of UI elements for a web application is present by way of example only.

Once a web application is released to production, it may undergo continuous enhancements and bug fixes. Such enhancements and/or bug fixes may include updates to the front-end or back-end of a web application, changes on the UI, etc. In any software development lifecycle (SDLC) approach, testers will test web application requirements in each "sprint" or release using different testing strategies and approaches. In most cases, this testing takes place in a staging or pre-production environment before releasing the new version of the web application to a production environment.

Functional and regression testing of web applications requires a significant amount of time and manual effort. In order to reduce this time and cost, various testing automation tools may be leveraged. Such testing automation tools include, but are not limited to Selenium, WinApp driver, Cypress, etc. Generally, testing automation tools identify UI elements of a web application (e.g., text boxes, radio buttons, dropdown menus, forms, etc.) by using Extensible Markup Language (XML) Path Language (XPath) or CSS. Such approaches find the location of any particular element on a web page of a web application using an HTML DOM structure, and use such elements in test scripts for UI actions.

For test automation of web applications, automation testing engineers may expend significant time and effort to add and/or update the locators of UI elements depending upon the UI changes between different versions of a web application. Illustrative embodiments provide tools which compare the UI of different versions of a web application (e.g., a previous release/state and a current release/state) to determine the differences therebetween, and to use such determined differences for performing testing of the web application. In some embodiments, the differences may be determined in the context of functional test automation which includes: differences with respect to UI elements, HTML, CSS, etc., including attributes that will be used for functional and regression testing automation; and generating locators (e.g., XPath, CSS) of both existing and newly-added UI elements. The technical solutions described herein can thus be used to help test engineers to analyze the differences, to update locators in testing scripts as needed, etc.

Web applications may undergo frequent enhancements with every sprint/release. As part of the software testing lifecycle (STLC), testers may adapt different testing strategies and approaches to meet the quality of deliverables. The time and effort required to update test scripts with new or updated web elements is directly proportional to the number of changes requested in a particular release. It generally takes a lot of time to update these changes in automation test scripts. Web applications with rich, layered UIs including hundreds or perhaps thousands of UI elements that require updates in the test scripts can increase the time and resources needed for maintenance of automation test suites. Further, such updates are prone to human errors, omitting test coverage, and have significant overhead resulting in significant cost/time used.

Web application automation testing allows web application software to be put through multiple test scenarios, and it also allows the same tests to be run repeatedly, quickly and accurately. Test results will be effective only if test scripts are written correctly and the right tools are in place. As the pace and frequency of changes to web applications increase, it becomes time consuming to update one or more application testing suites each of which may include one or several automation tests that are to be run on web applications for testing UI changes to web applications.

The technical solutions described herein provide a web application UI comparator tool, which can provide various advantages and improvements for testing new releases of web applications. The web application UI comparator tool described herein, for example, can be used to automatically identify portions or elements of web applications which have been added, removed or altered between different versions of a web application (e.g., between a current release or state of a web application and a previous release or state of the web application). The web application UI comparator tool described herein enables a user to input or specify particular versions of a web application to be compared (e.g., current and previous releases of a web application or a portion thereof, such as a particular web page of a web application), and the web application UI comparator tool will perform a comparison of web elements of the specified versions of the web application based at least in part on analysis of HTML DOM structures of the specified versions of the web application.

DOM structures may include HTML tags, attributes, inner text, inline stylings, etc. The web application UI comparator tool in some embodiments converts the DOM structures of two versions of a web application or a portion thereof (e.g., such as one or more specific web pages thereof) into tree structures (e.g., a first tree structure T1 for a first version of the web application and a second tree structure T2 for a second version of the web application). The tree structures for the different versions of the web application are parsed to identify differences therebetween. The differences between the tree structures of the different versions of the web application may be used to generate a JavaScript Object Notation (JSON) object, which is then categorized and rendered to a graphical user interface (GUI) of a client device (e.g., associated with a test engineer or other user utilizing the web application UI comparator tool).

Once the comparison between the different versions of the web application is completed, the web application UI comparator tool may provide various results or outputs, including but not limited to: a list of added, deleted or changed elements of the web application, along with clickable links or buttons (e.g., which may be in the form of XPath or CSS locators for the elements) allowing a user to view such added, deleted or changed elements in the different versions of the web application; and a report with one or more tables or other data structures listing the element differences (e.g., additions, deletions and modifications) between the different versions of the web application. In some embodiments, reports generated by the web application UI comparator tool will group the element differences according to type (e.g., HTML differences, styling differences, etc.) to let a user view them using a "tabular view" link. The reports generated by the web application UI comparator tool may also provide clickable links, buttons or other interface features for viewing generated "locators" (e.g., XPath, CSS, etc.) for the elements of the web application that are changed (e.g., added, deleted or modified).

The reports generated by the web application UI comparator tool advantageously provide convenience, efficiency, speed and accuracy for testers and software developers, as well as improved customer or other end-user satisfaction through various levels of reporting. The web application UI comparator tool can further be utilized for tracking UI changes for current release requirements, and for identifying regression defects early in a release cycle. The reports in some embodiments may be used to automatically select and run test cases on different versions of the web application which are focused on the changed elements of the web application's UI. The web application UI comparator tool can help test engineers, developers or other users to compare two different versions of a web application at any given time, and to automate generation of artifacts (e.g., element locators, reports) which can expedite test automation, including but not limited to functional and regression testing.

Figure 5:
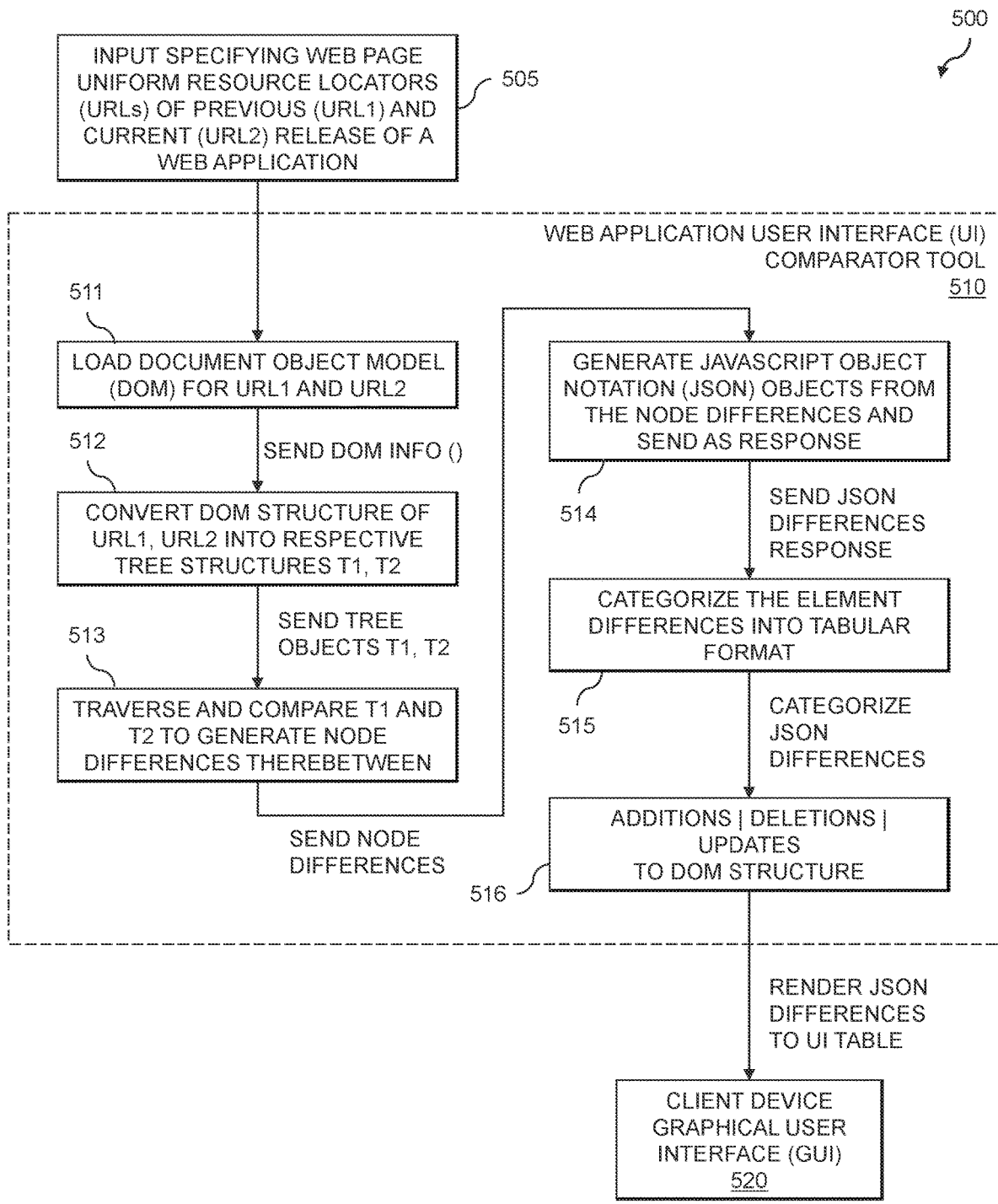
FIG. 5 shows a system flow for generating a comparison of user interface elements of different versions of a web application in an illustrative embodiment.
Figure 7:
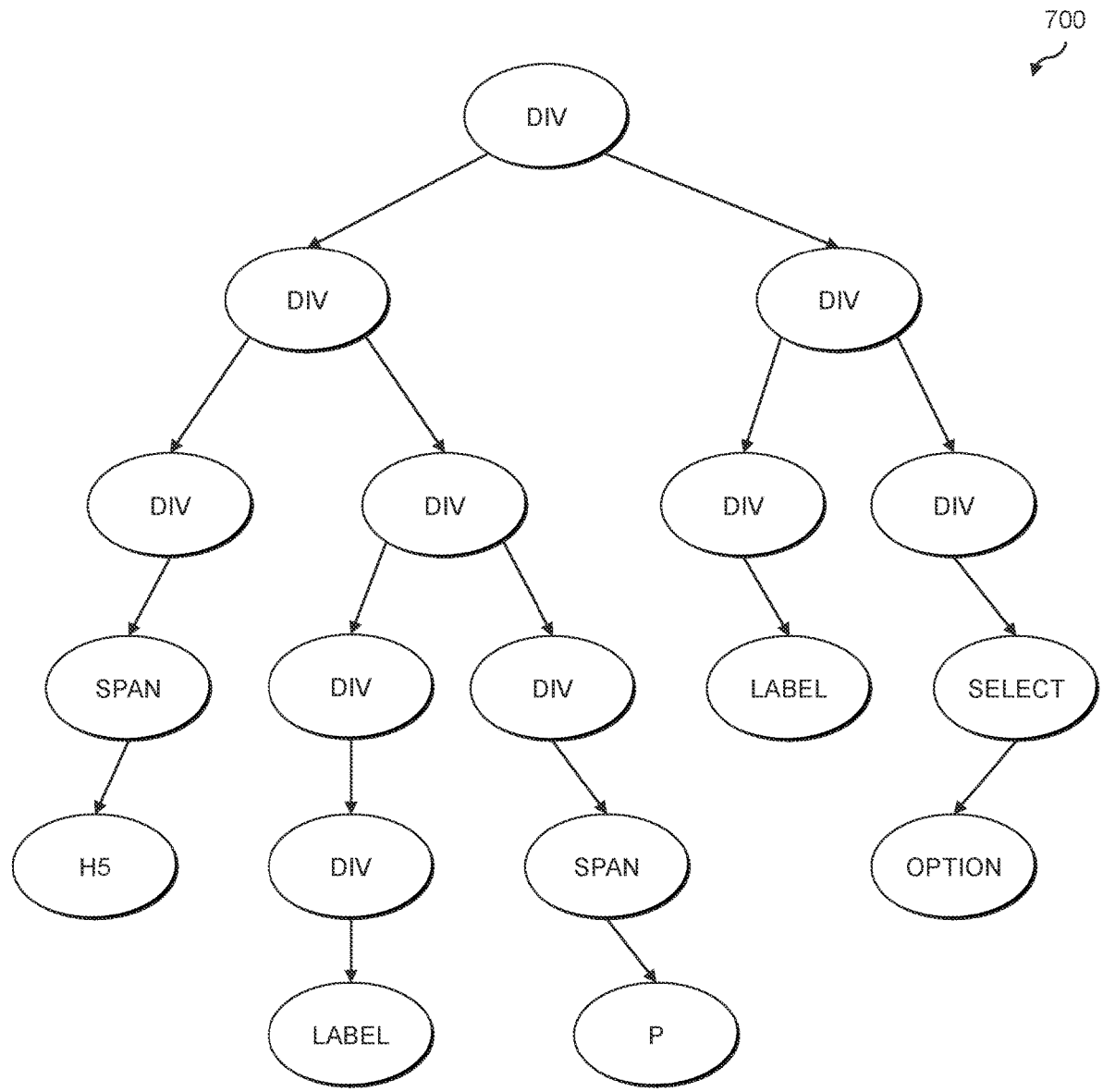
FIG. 7 shows a tree structure converted from a document object model structure of a web application in an illustrative embodiment.

FIG. 5 shows a workflow 500 for utilization of a web application UI comparator tool 510. The workflow 500 begins with input 505 specifying web page URLs for two versions of a web application or a portion thereof (e.g., a web page of a web application). In the description below, it is assumed that the input includes a first URL (URL1) for a previous version of a web application and a second URL (URL2) for a current version of the web application. The web application UI comparator tool 510 in step 511 loads DOM structures for URL1 and URL2. The web application UI comparator tool 510 may utilize one or more application programming interfaces (APIs) for loading the DOM structures for URL1 and URL2. For example, an API may be invoked given URL1 and URL2 as input, with the API returning DOM structures for URL1 and URL2. The DOM structures (e.g., for the current and previous versions of the web application specified by URL1 and URL2) are then used in step 512 for converting the DOM structures of URL1 and URL2 into respective tree structures T1 and T2. The tree structure objects T1 and T2 are then traversed and compared in step 513 to generate node differences therebetween. FIG. 6 shows an example DOM structure 600 for a web page of a web application, and FIG. 7 shows a tree structure 700 obtained through conversion of the DOM structure 600 of FIG. 6.

In step 514, the web application UI comparator tool 510 utilizes the node differences to generate JSON objects. The JSON objects characterize the node differences between the tree structures T1 and T2, and are used in step 515 to categorize the element differences for the current and previous version of the web application in a tabular format, shown as output 516. The tabular format, for example, may categorize differences as being additions to the DOM structure, deletions from the DOM structure, and updates to the DOM structure. The categorized JSON data may then be rendered on a client device GUI 520 (e.g., as a table, in a tabular format with different tabs for element additions, deletions and modifications, etc.).

Figure 8A:

FIGS. 8A-8C show example interface screens of the web application UI comparator tool 510 which may be rendered on the client device GUI 520. FIG. 8A shows an interface screen 800 of the web application UI comparator tool 510 which enables a user to input selections of web application versions to be compared (e.g., input 505 in the workflow 500 of FIG. 5). Here, a user may be prompted to provide or input links to previous and current releases of a web page (e.g., URL1 and URL2) of a web application through clicking or selecting respective "browse" buttons. Once such links are selected, the web application UI comparator tool 510 is run when the user clicks or selects the "compare" button.

Once the compare button is selected, the web application UI comparator tool 510 will load DOM structures (e.g., DOM1 and DOM2) for the specified previous and current releases of the web page of the web application (e.g., step 511 in the workflow 500). The web application UI comparator tool 510 will then convert the DOM structures into respective tree structures T1 and T2 (e.g., step 512 in the workflow 500), and then compares T1 and T2 to determine the differences between the previous and current releases of the web page of the web application (e.g., steps 513 through 516 in the workflow 500).

FIG. 8B shows an output interface screen 850 following the above processing, where the interface is updated with a report which shows visualization of UI differences between the previous and current releases of the web page of the web application (e.g., changes from the previous release to the current release, and changes from the current release to the previous release). This may include, for example, visualizations such as images or screenshots of the changed UI elements (e.g., pictures of added/deleted/modified UI elements). The output interface screen 850 shown in FIG. 8B also includes artifacts produced by the web application UI comparator tool 510, including links (e.g., buttons or other interface features) allowing a user: to access a tabular view 875 (shown in FIG. 8C) of the changes between the previous and current releases of the web page of the web application; to view code files of the changed UI elements; and to generate locators (e.g.,)(Paths) to the changed UI elements. The tabular view 875 shown in FIG. 8C redirects the interface of the web application UI comparator tool 510 to a table structure with different columns or tabs showing, for example, added and deleted element locators listed with corresponding element types. In some embodiments, the tabular view 875 may be color coded or otherwise have visual effects that highlight the categories (e.g., green for added elements, red for deleted elements, yellow for modified elements).

Various use cases or scenarios will now be described, including element addition, deletion, and modification.

Element addition: assume that a new element is added to a current release of a web page of a web application, such as a heading tag (e.g., an <h3> tag) in the current release (URL2) of the web page of the web application. When the DOM of the current release of the web page of the web application is converted to the tree structure T2, there will be an additional node "h3" not present in the tree structure T1 (converted from the DOM of the previous release, URL1, of the web page of the web application). Further assume that all the elements below the new "h3" node remain as-is. Upon comparing the nodes of T1 and T2, the additional "h3" node is not matched with T1. The "h3" node is thus categorized as an element addition.

Element deletion: assume that an element is deleted in a current release of a web page of a web application, such as an input tag (e.g., an <input> tag) that is in the previous release (URL1) of the web page of the web application but which is not in the current release (URL2) of the web page of the web application. When the DOM structure of the current release of the web page of the web application is converted to the tree structure T2, the node corresponding to the deleted <input> tag will not be present. The tree structure T1 (converted from the DOM structure of the previous release of the web page of the web application), however, will have the node for the deleted <input> tag. Upon comparing the nodes of T1 and T2, the "extra" <input> tag node of T1 which is not matched with any corresponding node in T2 will be categorized as an element deletion.

Figure 9:
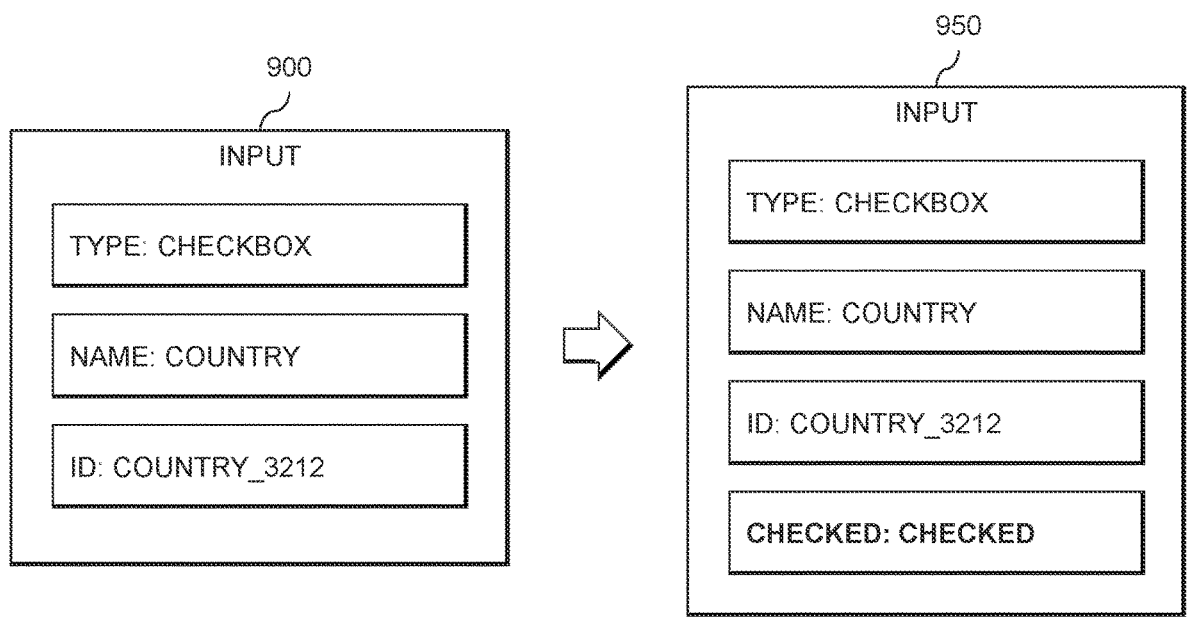
FIG. 9 shows a report of a change in properties of a web element of a web application in an illustrative embodiment.

Element modification: assume that there are no added or deleted web elements between current and previous releases of a web page of a web application, but there is a change in element property of an element between the current and previous releases of the web page of the web application. More specifically, consider an element property change where an attribute of a "check box" is made or set to "checked" by default. This is illustrated in FIG. 9, which shows an element property 900 in the previous release of the web page of the web application, along with an element property 950 in the current release of the web page of the web application with the changed property highlighted in bold. Here, the node counts of the tree structures T1, T2 (converted from the DOM structures of URL1, URL2) remain the same, but the attribute of a node is changed. This is identified through a deep comparison of node objects in the tree structures T1, T2, which includes attribute comparisons. Attribute differences such as that illustrated in FIG. 9 are categorized as element modifications.

The technical solutions described herein provide various advantages. Unlike a simple comparison of two sets of code, the technical solutions described herein provide a comparison of two versions or releases of a web application (or a portion thereof, such as one or more web pages of a web application) which generates a report of UI differences therebetween. In some embodiments, the UI differences are generated in the form of JSON objects which can be rendered on a GUI (e.g., of a client device) to help test engineers, developers or other users to identify defects easily. Further, the report may be used to update focused automation test cases which are specific to the changed web elements between the different version of the web application. Thus, the technical solutions described herein can save time, capacity and resources, and bring in the value of having standards in generating locators (e.g., XPath, CSS) and ensuring test coverage for the changed web elements. The accuracy of defects identified using the web application UI comparator tools described herein is improved. Further, the web application UI comparator tools described herein are easy to use by various stakeholders, and are not limited to any particular testing stage—the web application UI comparator tools may be used for functional, regression, user acceptance testing (UAT), smoke testing, etc. The web application UI comparator tools may also be used in different instances of an environment (e.g., staging, production, etc.).

The web application UI comparator tools described herein may provide DOM structure comparison results which detail different categories of web element changes between different versions or releases of a web application. For example, the details of added, removed and modified elements may be presented in a tabular view which can be very helpful in unit testing, as well as functional/regression testing where a team is operating in sprint-based methods to release a product, or are working on enhancement of already released products. The automated generation of locators (e.g., XPath, CSS) also advantageously makes such locators readily available thereby reducing manual effort and saving resources.

Further, there may be different environments in which web applications run (e.g., staging, production, etc.). If the SDLC is rigorous with frequent releases (e.g., weekly releases), the web application UI comparator tools described herein can help to get a summary of potential defects with different releases or versions of the web application (e.g., from a table or tabular view generated by the web application UI comparator tools). Efforts invested in testing UI-related changes in various cycles, including functional and regression cycles, can thus be cut down by a huge percentage in performing meticulous tasks. This allows testers to focus more on testing the logic of the web application, coverage, and other activities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining differences between web elements of different versions of web applications will now be described in greater detail with reference to FIGS. 10 and 11. Although described in the context of system 100, these platforms may also be used to implement at least portions of other information processing systems in other embodiments.

Figure 10:
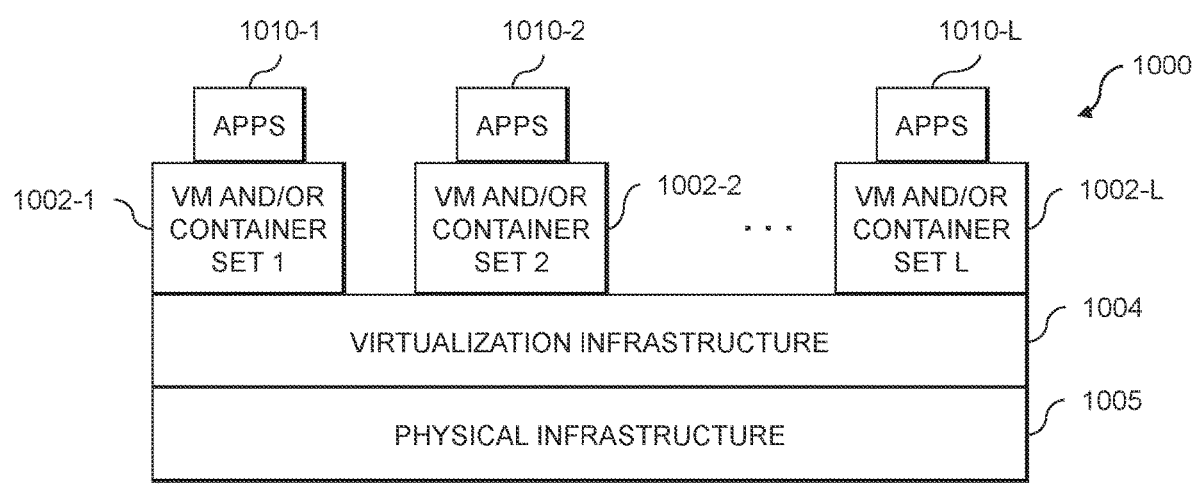
FIGS. 10 and 11 show examples of processing platforms that may be utilized to implement at least a portion of an information processing system in illustrative embodiments.
Figure 11:
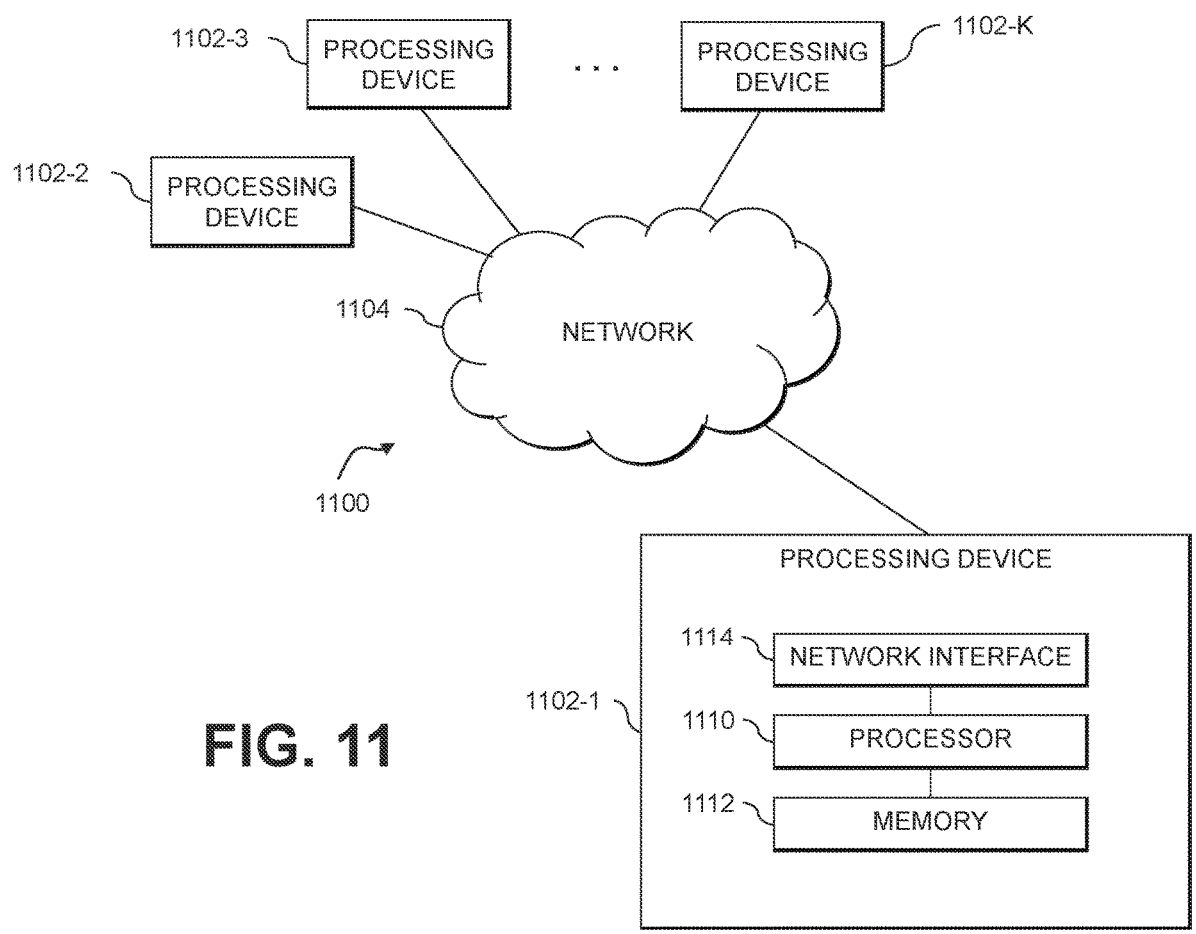

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining differences between web elements of different versions of web applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application components, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
selecting first and second versions of at least a given portion of a web application;
obtaining first and second document object model structures of the first and second versions of the given portion of the web application;
generating, based at least in part on the first and second document object model structures, first and second tree structures, the first and second tree structures comprising nodes representing web elements of the given portion of the web application;
identifying node differences between the first and second tree structures;
generating, based at least in part on the identified node differences, information characterizing differences between web elements in the first and second versions of the given portion of the web application; and
initiating execution of at least one automated action based at least in part on the generated information characterizing differences between web elements in the first and second versions of the given portion of the web application;
wherein generating the information characterizing the differences between web elements in the first and second versions of the given portion of the web application comprises generating a given set of locators for at least a subset of the web elements which are different in the first version of the given portion of the web application relative to the second version of the given portion of the web application; and
wherein the at least one automated action comprises:
updating an existing set of locators in one or more automation test cases to the given set of locators; and
executing the one or more automation test cases with the given set of locators.

2. The apparatus of claim 1 wherein the first version of the given portion of the web application is associated with a current release of the web application and the second version of the given portion of the web application is associated with a previous release of the web application.

3. The apparatus of claim 1 wherein the given portion of the web application comprises a web page of the web application.

4. The apparatus of claim 1 wherein selecting the first and second versions of the given portion of the web application comprises selecting a first uniform resource locator for a given web page of the first version of the web application and selecting a second uniform resource locator for the given web page of the second version of the web application.

5. The apparatus of claim 1 wherein obtaining the first and second document object model structures comprises invoking an application programming interface which takes as input uniform resource locators of the the first and second versions of the given portion of the web application and which outputs the first and second document object model structures for the first and second versions of the given portion of the web application.

6. The apparatus of claim 1 wherein identifying the node differences between the first and second tree structures comprises:
identifying one or more nodes present in the first tree structure which are not present in the second tree structure as added web elements in the first version of the given portion of the web application;
identifying one or more nodes present in the second tree structure which are not present in the first tree structure as deleted web elements in the first version of the given portion of the web application; and
identifying one or more nodes having element properties in the first tree structure that are different than element properties in corresponding nodes in the second tree structure as modified web elements in the first version of the given portion of the web application.

7. The apparatus of claim 1 wherein the subset of the web elements which are one of added, deleted and modified in the first version of the given portion of the web application relative to the second version of the given portion of the web application.

8. The apparatus of claim 1 wherein the given set of locators comprise Extensible Markup Language (XML) Path Language (XPath) locators.

9. The apparatus of claim 1 wherein the at least one automated action comprises generating visualizations of the subset of the web elements which are added, deleted and modified in the first version of the given portion of the web application relative to the second version of the given portion of the web application.

10. The apparatus of claim 1 wherein the at least one automated action comprises generating links to code files of the subset of the web elements which are added, deleted and modified in the first version of the given portion of the web application relative to the second version of the given portion of the web application.

11. The apparatus of claim 1 wherein the at least one automated action comprises generating a tabular view categorizing which of the subset of the web elements are added, deleted and modified in the first version of the given portion of the web application relative to the second version of the given portion of the web application.

12. The apparatus of claim 1 wherein the one or more automation test cases are selected from an automation testing suite, the one or more automation test cases being customized for testing of the subset of the web elements.

13. A computer program product comprising a non-transitory processor-readable storage medium having stored therein program code of one or more software programs, wherein the program code when executed by at least one processing device causes the at least one processing device to perform steps of:

selecting first and second versions of at least a given portion of a web application;

obtaining first and second document object model structures of the first and second versions of the given portion of the web application;

generating, based at least in part on the first and second document object model structures, first and second tree structures, the first and second tree structures comprising nodes representing web elements of the given portion of the web application;

identifying node differences between the first and second tree structures;

generating, based at least in part on the identified node differences, information characterizing differences between web elements in the first and second versions of the given portion of the web application; and initiating execution of at least one automated action based at least in part on the generated information characterizing differences between web elements in the first and second versions of the given portion of the web application;

wherein generating the information characterizing the differences between web elements in the first and second versions of the given portion of the web application comprises generating a given set of locators for at least a subset of the web elements which are different in the first version of the given portion of the web application relative to the second version of the given portion of the web application; and wherein the at least one automated action comprises:
updating an existing set of locators in one or more automation test cases to the given set of locators; and
executing the one or more automation test cases with the given set of locators.

14. The computer program product of claim 13 wherein the first version of the given portion of the web application is associated with a current release of the web application and the second version of the given portion of the web application is associated with a previous release of the web application.

15. The computer program product of claim 13 wherein the subset of the web elements are one of added, deleted and modified in the given portion of the first version of the web application relative to the given portion of the second version of the web application.

16. The computer program product of claim 13 wherein the given set of locators comprise Extensible Markup Language (XML) Path Language (XPath) locators.

17. A method comprising steps of:

selecting first and second versions of at least a given portion of a web application;

obtaining first and second document object model structures of the first and second versions of the given portion of the web application;

generating, based at least in part on the first and second document object model structures, first and second tree structures, the first and second tree structures comprising nodes representing web elements of the given portion of the web application;

identifying node differences between the first and second tree structures;

generating, based at least in part on the identified node differences, information characterizing differences between web elements in the first and second versions of the given portion of the web application; and initiating execution of at least one automated action based at least in part on the generated information characterizing differences between web elements in the first and second versions of the given portion of the web application;

wherein generating the information characterizing the differences between web elements in the first and second versions of the given portion of the web application comprises generating a given set of locators for at least a subset of the web elements which are different in the first version of the given portion of the web application relative to the second version of the given portion of the web application; and wherein the at least one automated action comprises:
updating an existing set of locators in one or more automation test cases to the given set of locators; and
executing the one or more automation test cases with the given set of locators; and wherein the method is performed by at least one processing device comprising a processor coupled to a memory.

18. The method of claim 17 wherein the first version of the given portion of the web application is associated with a current release of the web application and the second version of the given portion of the web application is associated with a previous release of the web application.

19. The method of claim 17 wherein the subset of the web elements are one of added, deleted and modified in the given portion of the first version of the web application relative to the given portion of the second version of the web application.

20. The method of claim 17 wherein the given set of locators comprise Extensible Markup Language (XML) Path Language (XPath) locators.

\* \* \* \* \*